United States Patent [19]

Schaefer

[11] Patent Number: 5,513,556
[45] Date of Patent: May 7, 1996

[54] PACKING GLAND CONSTRUCTION

[76] Inventor: Kenneth A. Schaefer, 1255 Emerald Dr., Hartford, Wis. 53026

[21] Appl. No.: 159,667

[22] Filed: Nov. 30, 1993

[51] Int. Cl.⁶ ............................................. F16J 15/32
[52] U.S. Cl. ..................... 92/168; 277/115; 277/166; 277/181; 277/189 R
[58] Field of Search ........................ 277/47, 102, 103, 277/105, 115, 152, 166, 178, 181, 183, 184, 188 R, 189, 190, 168

[56] References Cited

U.S. PATENT DOCUMENTS

| | | | |
|---|---|---|---|
| 2,126,366 | 8/1938 | Boyer | 277/115 |
| 2,168,764 | 8/1939 | Day | 277/115 |
| 2,634,145 | 4/1953 | Monahan | 277/188 |
| 2,639,198 | 5/1953 | Kirkham | |
| 3,037,781 | 6/1962 | Peras | 271/188 R |
| 3,700,246 | 10/1972 | Enarsson | 277/29 |
| 3,812,938 | 5/1974 | Fader et al. | 188/322 |
| 4,261,583 | 4/1981 | de Vries, Jr. et al. | 277/181 |
| 4,717,161 | 1/1988 | Stremechus | 277/105 |
| 4,813,343 | 3/1989 | Schaefer | 92/243 |
| 5,165,700 | 11/1992 | Stoll et al. | 277/152 |

FOREIGN PATENT DOCUMENTS

| | | | |
|---|---|---|---|
| 0148246 | 7/1950 | Australia | 277/188 R |
| 0877184 | 11/1981 | U.S.S.R. | 277/152 |

*Primary Examiner*—Daniel G. DuPumpo
*Attorney, Agent, or Firm*—Andrus, Sceales, Starke & Sawall

[57] ABSTRACT

An improved packing gland construction for a fluid cylinder that includes an angular elongated resilient sealing member disposed in contact with the piston rod of the cylinder. An end of the sealing member facing the interior of the cylinder is provided with a flexible lip and the internal pressure within the cylinder acts to urge the lip inwardly into sealing engagement with the piston rod. The outer end of the sealing member is provided with a tapered wiper which rides on the piston rod and acts to remove foreign material from the rod. The outer surface of the sealing member is formed with a circumferential groove which receives a ring, and the inner end of the ring bears against an abutment on the cylinder while the outer end of the ring is engaged by a cap that is secured to the end of the cylinder. The cap has an annular inclined surface which engages and urges the wiper inwardly against the piston rod.

8 Claims, 1 Drawing Sheet

PACKING GLAND CONSTRUCTION

BACKGROUND OF THE INVENTION

In a conventional fluid cylinder, a piston rod extends through an opening in the end of the cylinder and a packing gland is utilized to provide a seal to the sliding piston rod. Various types of packing glands have been employed in the past and the typical packing gland is complex in structure and is relatively costly.

U.S. Pat. No. 2,639,198 describes a packing gland formed of a resilient material reinforced with fabric. The seal is contained within a recess in an end cap of the cylinder and the inner end of the seal engages a shoulder on the cylinder end cap, while the outer end the seal is engaged by a snap ring. The inner end of the seal in U.S. Pat. No. 2,639,198 is provided with an annular flexible lip which is sealingly engaged with the piston rod while the outer end of the seal is formed with a tapered wiper member that rides along the piston rod.

U.S. Pat. No. 3,812,938 relates to a packing gland construction for a vehicle shock absorber. In the construction of this patent, the packing gland consists of three separate resilient members including a generally cylindrical sealing sleeve, an annular sealing member located inwardly of the sleeve which is retained within an end cap of the cylinder by a retaining ring and a separate resilient wiper member located axially outward of the sealing sleeve and which is retained within a recess in the end cap by a cup-shaped housing.

SUMMARY OF THE INVENTION

The invention is directed to an improved guide and seal construction for a reciprocating element and has particular application as a packing gland for a fluid cylinder. The construction of the invention includes an annular elongated resilient sealing member formed of a material, such as nitrile rubber, which is mounted in an end of the cylinder and surrounds the piston rod. The end of the sealing member facing inwardly of the cylinder is provided with a flexible annular lip which is exposed to the internal pressure of the cylinder, thus urging the lip radially inward into tight sealing engagement with the piston rod. Located on the outer end of the sealing member is a tapered wiper member which rides along the outer surface of the piston rod to remove foreign material from the rod.

To secure the sealing member within the end of the cylinder, a ring is mounted within a circumferential groove in the outer surface of the sealing member. The outer portion of the ring projects radially outward of the groove and defines a shoulder which is in engagement with an abutment on the end of the cylinder, thus preventing axially inward displacement of the sealing member relative to the cylinder.

A cap is secured to the end of the cylinder and bears against the outer surface of the ring, thus preventing outward displacement of the ring and seal from the cylinder end.

As a feature of the invention, the cap is provided with an inclined surface which engages the tapered wiper member on the outer end of the sealing member. The engagement of the inclined surface on the cap with the wiper member serves to wedge the wiper member radially inward into tight engagement with the piston rod.

The construction of the invention provides a more effective seal, eliminating leakage of fluid from the cylinder along the piston rod.

As the sealing member has a substantial axial length, it provides an elongated bearing surface providing maximum support for side loading.

The seal construction of the invention includes fewer parts than seals as used in the past and facilitates assembly and disassembly for repair or replacement.

As the seal is preferably formed of nitrile rubber, the seal will perform effectively at temperatures from −70° F. up to 350° F., enabling the cylinder to be used in systems where temperatures can reach this value.

Other objects and advantages will appear during the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
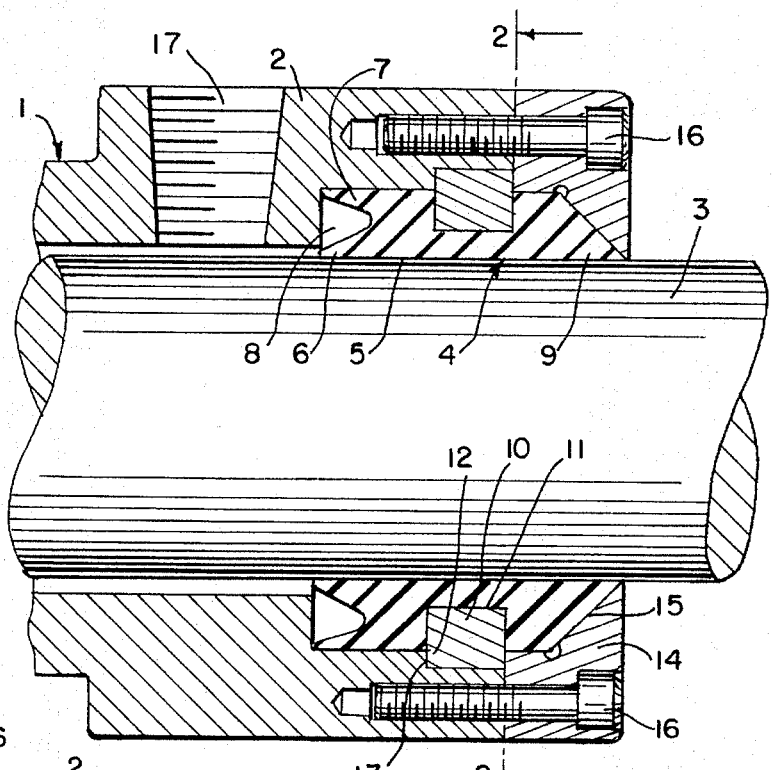
FIG. 1 is a fragmentary longitudinal section of a fluid cylinder incorporating the packing gland construction of the invention.
Figure 2:
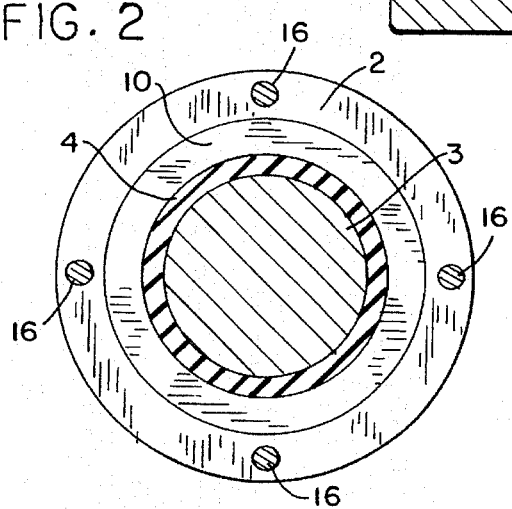
FIG. 2 is a section taken along line 2—2 of FIG. 1.

FIGS. 1 and 2 illustrate a packing gland construction which has particular use with hydraulic cylinders as used in road machinery. As seen in FIG. 1, the cylinder 1 is provided with an enlarged end 2 and a piston rod 3 which carries a piston, not shown, is mounted for sliding movement within cylinder 1.

Mounted in the end 2 of cylinder 1 is an annular elongated resilient seal 4. Seal 4 is preferably formed of a material, such as nitrile rubber, which has a hardness in the range of about 60 to 80 durometer and is capable of withstanding temperatures from −70° F. up to about 350° F. without deterioration or permanent deformation.

Seal 4 is formed with an inner annular surface 5 which can be slightly concave in an axial direction. An annular flexible tapered lip 6 and a tapered annular flange 7 are formed on the inner end of seal 4 and define an annular recess 8. During operation of the cylinder, the pressure of the fluid within the cylinder will act in the recess 8, thus urging the lip 6 radially inward against piston rod 3 and urging the flange 7 outwardly against cylinder section 2 thus preventing leakage at these interfaces.

As shown in FIG. 1, the opposite end of seal 4, facing outwardly of the cylinder, is formed with an annular inclined surface which defines a tapered wiper 9. The wiper is intended to ride along the outer surface of piston rod 2 and remove foreign material, such as dirt, ice, snow, and the like.

To secure seal 4 to cylinder section 2, a rigid ring 10, preferably formed of metal, is mounted within a circumferential groove 11 formed in the outer surface of seal 4, as shown in FIG. 1. The outer portion of ring 10 projects radially beyond the seal 4 and defines an inwardly facing shoulder 12, which is engaged with a ledge or an abutment 13 formed in cylinder section 2. The engagement of shoulder 12 with abutment 13 prevents ring 10 and seal 4 from being displaced axially inward of the cylinder.

Secured to the outer end of cylinder section 2 is an annular cap or end member 14. A plurality of bolts 15 can be utilized to secure cap 14 to cylinder section 2.

Cap 14 is formed with an inclined annular surface 15 which engages the tapered outer surface of wiper 9 and as the cap is secured to the cylinder section 2 by threading down of bolts 15, the engagement of inclined surface 15 with wiper 9 will urge the wiper inwardly into tight engagement with the outer surface of the piston rod.

Cylinder section 2 is provided with a threaded opening 17 which receives a fitting for supplying oil to the interior of the cylinder.

To assemble the seal assembly, the ring 10, either as a continuous ring or a split ring, is initially inserted in the groove 11 of the seal 4. The preassembled seal and ring are then inserted into the end of the cylinder until the shoulder 12 of ring 10 engages the abutment 13 on the cylinder. The cap 14 is then applied to the end of the cylinder through bolts 16.

Figure 3:
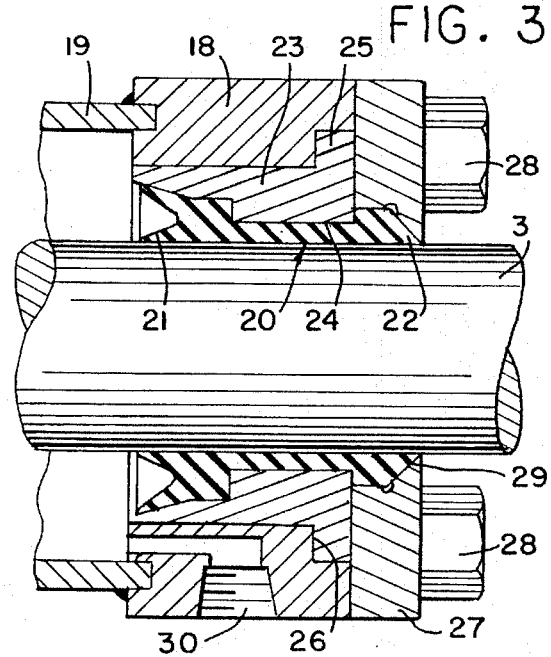
FIG. 3 is a fragmentary longitudinal section of a fluid cylinder incorporating a modified form of the seal of the invention.

FIG. 3 illustrates a modified form of the packing gland construction of the invention which has particular use with machine tool cylinders.

As seen in FIG. 3, an enlarged annular end member 18 is secured to the end of cylinder 19 by welding or the like. An annular resilient seal 20, similar to seal 4 of the first embodiment, is connected to end member 18 and is adapted to ride against the outer surface of the piston rod 3.

As in the case of the first embodiment, the seal 20 is formed with an annular flexible lip 21, which faces inwardly of the cylinder, and a tapered wiper member 22 which faces outwardly of the cylinder.

To secure seal 20 to cylinder end member 18, a rigid ring 23 is mounted within a groove 24 in the outer surface of seal 20. Ring 23 is formed with an outwardly extending flange 25 which is engaged with a an outwardly facing abutment or shoulder 26 in member 18, thus serving as a stop to prevent axial inward movement of the ring 23 and seal 20 relative to the cylinder.

As in the case of the first embodiment, a annular cap 27 is secured to the end of end member 18 by bolts 28, and cap 27 is provided with an inclined surface 29 which engages wiper member 22 and urges the wiper member inwardly against the outer surface of the piston rod.

In the construction shown in FIG. 3, hydraulic fluid can be introduced into the cylinder 19 through a passage 30 formed in end member 18. The outer portion of passage 30 is threaded and receives a suitable fitting.

Figure 4:
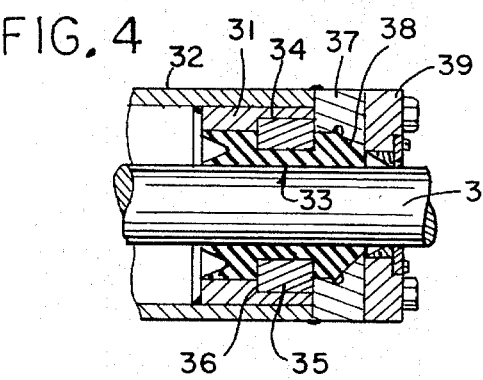
FIG. 4 is a fragmentary longitudinal section of a fluid cylinder incorporating a second modified form of the seal of the invention.

FIG. 4 illustrates a further form of the invention in which the packing gland is utilized with a vehicle shock absorber. In this construction, an annular end member 31 is secured within an end of cylinder 32 such as by welding or the like. An elongated resilient seal 33, similar to seal 4, is mounted within the end member 31.

The outer surface of seal 33 is provided with a circumferential groove 34 which receives a ring 35. The outer portion of the ring bears against an abutment or shoulder 36 on end member 31 to prevent axial displacement of the seal in an inward direction.

A cap 37, similar to cap 14, is secured to the end of the cylinder 32 such as by welding, and cap 37 is provided with an inclined surface 38 which engages the tapered wiper on the outer end of the seal, as previously described, to urge the wiper member of the seal into engagement with the outer surface of piston rod 3.

Figure 5:
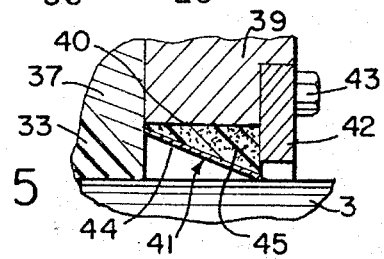
FIG. 5 is an enlargement of a portion of the structure of FIG. 4, showing the second wiper member.

As the shock absorber shown in FIG. 4 can encounter considerable ice and snow during service, a second wiper can be associated with the end of the cylinder. A ring 39 is secured to cap 37, such as by welding, and ring 39, as best seen in FIG. 5, has a central opening 40 which houses an annular wiper assembly 41. Wiper assembly 41 is retained within the opening by a retaining ring 42 which is connected in a recess in the outer face of ring 39 by screws 43.

Wiper assembly 41 can include a plurality of superimposed metal blades 44 which have a generally conical configuration and are mounted on a backing member 45. The free ends of blades 44 ride against the piston rod 3 and serve to remove ice, snow, and other foreign material from the piston rod.

As the internal pressure within the cylinder acts on the flexible lip, such as lip 6, an effective seal is provided with the sliding piston rod to prevent leakage or weepage of fluid from the cylinder.

Because the sealing member 4 has a substantial axial length, it provides a bearing surface which supports the piston rod against side-loading.

The packing gland construction of the invention has a fewer number of parts than packing glands as used in the past which reduces the overall cost and simplifies assembly and disassembly.

As the sealing member is preferably formed of nitrile rubber which is capable of performing at temperatures from −70° F. to 350° F., the packing gland can be used in closed loop hydraulic and pneumatic systems where temperatures can approach this value.

While the drawings have illustrated the packing gland as being used to provide a seal to a piston rod in a fluid cylinder, it is contemplated that the packing gland construction of the invention can be used in other applications where it is desired to provide a sliding seal to a reciprocating member.

Various modes of carrying out the invention are contemplated as being within the scope of the following claims, particularly pointing out and distinctly claiming the subject matter which is regarded as the invention.

I claim:

1. A seal assembly for sealing a reciprocating element within an opening in a pressurized structure, comprising an annular resilient sealing member having an elongated inner annular surface disposed in contact with said reciprocating element, an inner longitudinal end of said sealing member facing the pressurized interior of said structure having a tapered lip disposed in engagement with said reciprocating element, said sealing member having an annular groove in the outer circumference thereof, said structure having an internal groove radially aligned with the groove in said sealing member, a rigid ring disposed within the aligned grooves, an outer longitudinal end of said sealing member facing outwardly of said pressurized structure having a first flexible tapered wiper member disposed in engagement with said reciprocating element, said wiper member having an outer annular inclined surface, and an annular cap surrounding the reciprocating element and connected to the end of said structure, said cap having an internal tapered annular surface mating with and complementing the inclined surface on said seal, whereby longitudinal inward movement of said cap will cause the tapered surface on said cap to wedge the wiper member radially inward against said reciprocating element.

2. The seal assembly of claim 1, wherein said inner longitudinal end of said sealing member is also provided with a tapered annular flange spaced radially outward of said lip, the space between said lip and said flange defining an annular recess exposed to the interior of said cylinder.

3. The seal assembly of claim 1, and including a second annular wiper member disposed axially outward of said first wiper member and disposed an engagement with the outer surface of said reciprocating element.

4. The seal assembly of claim 3, wherein said second wiper member comprises an annular metal blade.

5. The seal construction of claim 1, wherein said sealing member is composed of nitrile rubber.

6. A fluid cylinder assembly, comprising a cylinder having an open end, a piston rod mounted for sliding movement in said cylinder and projecting through said open end, an annular resilient seal mounted in the open end of said cylinder and having an annular inner surface disposed in sliding engagement with said piston rod, said seal having an inner longitudinal end facing inwardly of said cylinder, said inner end defining a flexible tapered annular lip disposed in engagement with said piston rod, an outer longitudinal end of said seal facing outwardly of said cylinder and defining an annular wiper member disposed in engagement with said piston rod, said wiper member having an outer annular inclined surface, the outer end of said cylinder having an annular recess and the outer surface of the seal having an annular groove spaced longitudinally from the ends thereof, a rigid ring disposed within the recess and within the groove, and an annular cap surrounding said piston rod and connected to the open end of said cylinder, said cap having an inner tapered annular surface engaging and mating with the inclined surface on said seal, whereby inward longitudinal movement of said cap causes said tapered surface to wedge said wiper member radially inward toward said piston rod.

7. The seal assembly of claim 6, wherein said inner annular surface of said seal is concave in an axial direction.

8. The seal assembly of claim 6, wherein the seal is composed of nitrile rubber having a hardness of 60 to 80 durometer and is capable of withstanding temperatures from −70° F. to 340° F.

* * * * *